United States Patent

[11] 3,577,180

[72] Inventors Hans Albsmeier;
Karl Traub, Munich, Germany
[21] Appl. No. 725,790
[22] Filed May 1, 1968
[45] Patented May 4, 1971
[73] Assignee Siemens Aktiengesellschaft
Berlin, Germany
[32] Priority May 12, 1967
[33] Germany
[31] S109,856

[54] ELECTROMECHANICAL FILTER

12 Claims, 4 Drawing Figs.

[52] U.S. Cl. .......... 333/72
[51] Int. Cl. .......... H03h 9/26
[50] Field of Search .......... 333/71, 72; 310/8, 9

[56] References Cited

UNITED STATES PATENTS

| | | | |
|---|---|---|---|
| 3,439,295 | 4/1969 | Bise | 333/71 |
| 3,135,933 | 6/1964 | Johnson | 333/71 |
| 3,445,792 | 8/1969 | Borner | 333/71 |
| 2,829,350 | 4/1958 | Ibsen | 333/71 |
| 2,656,516 | 10/1953 | Doelz | 333/71 |
| 2,906,971 | 9/1959 | Mason et al. | 333/71 |

*Primary Examiner*—Herman Karl Saalbach
*Assistant Examiner*—C. Baraff
*Attorney*—Hill, Sherman, Meroni, Gross & Simpson

ABSTRACT: An electromechanical filter utilizing a plurality of rods mounted on a base plate parallel to each other and having one side of each resonator flattened or coupled together by a driving rod. Input and output electromechanical transducers are provided and a second rod is connected to certain of said resonators to eliminate undesired frequency characteristics.

INVENTORS
HANS ALBSMEIER
KARL TRAUB

BY Hill, Sherman, Meroni, Gross & Simpson
ATTORNEYS

ELECTROMECHANICAL FILTER

BACKGROUND OF THE INVENTION

1. Field of the Invention

An electromechanical resonator comprising a plurality of generally cylindrical shaped resonators mounted on a base plate parallel to each other and with one side of the resonators flattened, is disclosed.

2. Description of the Prior Art

Electromechanical filters have come into use in electrical circuits for filtering oscillations. With a high Q and sharpness of cutoff, such filters are very advantageous and often times superior to electrical filters. Certain filters of the prior art have exhibited spurious frequency responses such that frequencies outside of the desired passband pass through the filter.

SUMMARY OF THE INVENTION

The present invention relates to an electromechanical filter in which spurious responses are eliminated and comprises a plurality of generally cylindrical resonators mounted parallel to each other on a base plate and joined with a coupling rod. Input and output electromechanical transducers form portions of the filter to couple energy into and out of the filter. One side of each of the cylindrical resonators are flatted to improve the frequency response and a secondary coupling rod may be attached to certain of the resonators to aid in eliminating spurious and undesired frequency responses.

Other objects, features and advantages of the present invention will be readily apparent from the following detailed description of certain preferred embodiments thereof taken in conjunction with the accompanying drawings.

DESCRIPTION OF THE PREFERRED EMBODIMENTS

Figure 1A:
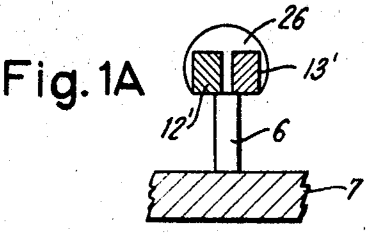
FIG. 1A is a sectional view taken on line IA–IA of FIG. 1.
Figure 1:
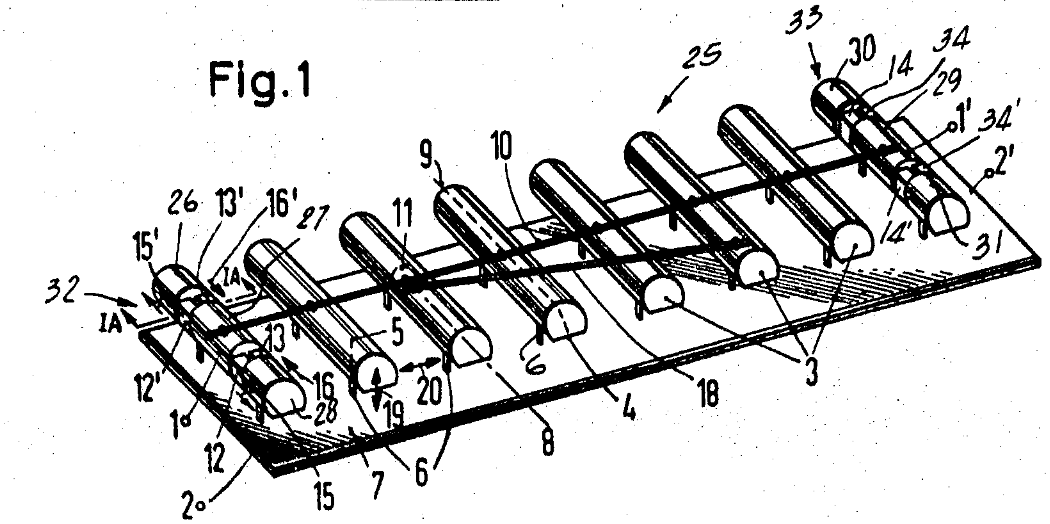
FIG. 1 is a perspective view of an electromechanical filter according to this invention.
Figure 2:
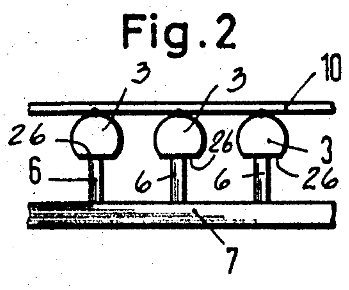
FIG. 2 is an end view of the cylindrical resonators of the filter of FIG. 1.

FIG. 1 illustrates an electromechanical filter 25 according to this invention which comprises a base plate 7 on which are mounted a plurality of support elements 6. A plurality of parallel mounted generally cylindrical shaped resonators 3 are mounted on the support elements 6 as shown in FIG. 2 and are formed with flatted sides 26 to which the support members 6 are attached.

In the filter of FIG. 1 there are six cylindrical resonators 3 attached to the base plate 7, but it is to be realized that different numbers of resonators may comprise the filter. At each end of the filter structure, input and output transducers are mounted. For example, an input transducer 32 is formed of three sections 26, 27 and 28 of generally cylindrical shape with flatted sides and which are joined together by electrostrictive blocks 12, 12′, 13 and 13′. The blocks 12, 12′, 13 and 13′ consist of electrostrictive material which are prepolarized such that the blocks 12 on one side of the axis of the input transducer 32 are polarized in a first direction, as indicated by the arrows 15 and 15′, and the blocks 13 and 13′ are polarized in a second direction, as indicated by the arrows 16 and 16′.

The output transducer 33 at the other end of the filter comprises three generally cylindrical sections 29, 30 and 31 which are joined together by electrostrictive blocks 14, 14′ and 34, 34′. The blocks 14, 14′ and 34, 34′ are polarized as are the blocks 12, 12′, 13 and 13′. The coupling wire 10 extends between the input transducer 32 and the output transducer 33 and engages the surface of all of the intermediate resonating elements 3. The coupling wire 10 is attached by welding or other suitable manner to the surfaces of the input and output transducers and the resonators 3, as shown.

A pair of input leads 1 and 2 are connected to the portion 27 of the input resonator 32 and the base plate 7. A pair of output leads 1′ and 2′ are connected to the portion 29 of the output resonator 33 and the base plate 7.

To obtain damping poles and thus eliminate spurious responses, an additional coupling rod 18 is attached to certain of the resonators 3, as shown in FIG. 1. As shown, the coupling rod 18 is mounted at an angle to the coupling rod 10 which extends generally transversely of the longitudinal axis of the resonators 3. The rod 18 is connected to the resonators at its ends and bridges over tow rods between its ends. In this embodiment the resonators to which the ends of the rod 18 are connected will be oscillating in phase-opposed manner. With this construction the damping pole below and the damping pole above the filter passband can be obtained and can be adjusted by the strength of the coupling rod 18.

Figure 3:
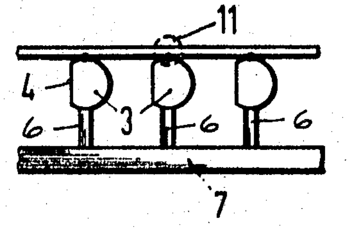
FIG. 3 illustrates a modification of the placement of the resonators.

FIG. 3 illustrates a modification of the invention wherein the resonators 3 are mounted so that the flat portions 4 are normal to the base plate 7 rather than parallel thereto, as in FIG. 2.

Recently, electromechanical filters have attained great practical importance and in spite of a considerably smaller space requirement, they are superior to the filters consisting of concentrated circuit elements with respect to the quality of their resonating elements. In addition, with a mechanical strong construction, a very reliable filter is obtained which may be free of temperature drift. However, in mechanical filters the individual resonators can vibrate at a larger number of natural vibrations which can result in undesired damping distortions in the band-pass of the filter and in undesired damping frequencies in the stop band. For these reasons, it is desirable to form a design so that interferring natural oscillations (called sideband oscillations) cannot be stimulated or transmitted. For the use in miniaturized circuits it is desirable to use mechanical resonators in which the resonance frequency depends not only upon the length of the resonator, but additionally also upon its cross-sectional area, since this allows a further dimension parameter. These results can be attained with bending resonators as resonant elements and coupling elements executing longitudinal oscillations. However, it is also desired to easily manufacture the filter by semiautomatic or completely automatic production means.

Mechanical filters with circular cross-sectional bending resonators mounted with their axes parallel are known. However, such filters cannot be cheaply and easily produced. Mechanical filters with the individual resonators formed as circular plates are also known. The coupling of the individual plates takes place over coupling elements executing longitudinal oscillations which are attached to the individual plates near the edges of the plates. Fastening such coupling elements is costly because the coupling elements have to be mounted through openings in the plates. Also, in such filters, there is undesired coupling if the individual plates have to be very closely spaced. This coupling occurs due to the air space between the individual plates.

It is the purpose of this invention to remedy these difficulties in a relatively simple manner. In particular, a manner for producing a mechanical filter by automatic machinery is disclosed.

In this invention resonators are coupled together by a coupling element so that they execute longitudinal oscillations, and at least the end resonators are provided with electromechanical transducer elements having an electrostrictive effect.

The filter according to this invention has the following characteristics:

a. The bending resonators consist of cylindrical bars of metallic material and are flattened on one side;

b. The individual resonators are fastened to a base plate by supporting elements at the vibration nodes and are loaded in torsion so that their longitudinal axes run parallel to one another;

c. The fastening of the bending resonators on the base plate is accomplished so that the flat portions of the bending resonators are parallel or perpendicular to the base plate and the points of attachment of the coupling element are at the same level; and d. The coupling element is formed of a continuous wire which runs perpendicular to the longitudinal axes of the resonators and is attached to the bending resonators so as to cause efficient transfer of energy. The end resonators are subdivided into small units consisting of electrostrictive material with blocks mounted between them. The blocks are polarized so that under the influence of an electric field the blocks on one side expand and on the other side contract.

In a simple manner damping poles in the stop band of the filter can be produced with one additional coupling element attached to the resonators.

The dimensions of the flattening of elements 3 is determined by the natural frequencies of bending perpendicular to the flattening and parallel to the flattening. These should differ by at least 1 percent.

The resonators 3 are constructed as cylindrical bars out of a metallic material such as steel with a relatively small temperature coefficient. The excitation of the bending oscillations takes place in such a manner that the individual resonators oscillate in the direction of double-arrow 20 which is to say parallel to the base plate so that the coupling element executes pure longitudinal oscillations. Because of the fastening of the coupling element at the oscillation maximum, a relatively strong coupling results. The longitudinal coupling results in relatively thin cross sections of the coupling element causing relatively strong coupling and consequently a relatively wide bandwidth of the filter. Because of the small cross section of the coupling element 10, undesired spurious oscillations such as caused by bending or shearing are practically eliminated by the coupling element 10.

Also, an electrostrictively operating electromechanical transducer system contributes to the spurious-wave freedom.

The following advantages result from the construction of the filter according to the invention.

The drawn semifinished material for resonators and coupling elements can be produced in simple and uniform manner. The tangential welding of two round parts which are approximately perpendicular to one another results in a very uniform weld and a very uniform coupling between the coupling element and the resonators. Also, adjustments of the coupling elements is eliminated or minimized. Since the welding takes place near the neutral axis, none of the zones important for oscillation are influenced. The round shape of the resonators prevents disturbances between each other through sound waves transmitted by air.

The cross-sectional shape of the resonators is produced by grinding round bars. Through the flattening 4 the two orthogonal natural oscillations always occurring because of the inhomogeneities of the material and of the cross section can be controlled and well-defined orientation of the two planes of oscillation 19, 20 can be attained. In actual filters it has been noted that the natural oscillation 19 not utilized should have a frequency distance of at least 1 percent from the utilized oscillation 20 or should lie outside the filter passband.

Although the resonators are asymmetrical, they have practically no interferring spurious waves. An essential reason for this is the use of end resonators which are stimulated to bending oscillations by the longitudinal piezoelectric effect and which exclusively respond to bending oscillations such as this is described in detail for the end resonators 32 and 33.

Because of the chosen form of the filter, its production can be done by relatively simple automatic machines. This includes the welding of the support wires 6, the adjustment of the resonators, the welding together of the steel and end resonators with the coupling wire 10 and the welding of the filter system onto the base plate 7.

Although minor modifications might be suggested by those versed in the art, it should be understood that we wish to embody within the scope of the patent warranted hereon all such modifications as reasonably and properly come within the scope of our contribution to the art.

We claim:

1. An electromechanical filter comprising: a plurality of resonating elements of generally cylindrical shape and having one side flattened mounted parallel to each other, input and output means comprising a plurality of relatively short cylindrical portions of electrostrictive material formed with one side flattened, a plurality of electrostrictive members joining said plurality of short cylindrical portions, and means coupling said input and output means to said plurality of resonating elements.

2. An electromechanical filter according to claim 1 comprising a secondary coupling means attached to certain of said resonating elements to improve the frequency response.

3. An electromechanical filter according to claim 2 wherein said secondary coupling means comprises a rod attached to the surface of certain of said resonating elements.

4. An electromechanical filter according to claim 1 wherein said electrostrictive members are attached to said cylindrical portions on opposite sides of their longitudinal axis and the electrostrictive members on one side of said axis are polarized in a first direction and those on the other side of said axis are polarized in the opposite direction.

5. An electromechanical filter comprising: a base plate, a plurality of support elements mounted on said base plate, a plurality of resonating elements of generally cylindrical shape and having one side flattened mounted parallel to each other on said support elements, input and output means to said plurality of resonating elements mounted on said support elements, and the flattened sides of the resonators are adjacent the base plate.

6. An electromechanical filter according to claim 5 comprising a secondary coupling means attached to certain of said resonating elements to improve the frequency response.

7. An electromechanical filter according to claim 6 wherein said secondary coupling means comprises a rod attached to the surface of certain of said resonating elements.

8. An electromechanical filter according to claim 7 wherein said secondary coupling means is connected to the resonating elements which oscillate in phase.

9. An electromechanical filter according to claim 7 wherein said secondary coupling means is connected to the resonating elements which oscillate out of phase.

10. An electromechanical filter comprising: a base plate, a plurality of support elements mounted on said base plate, a plurality of resonating elements of generally cylindrical shape and having one side flattened mounted parallel to each other on said support elements, input and output means to said plurality of resonating elements mounted on said support elements, and the flattened sides of the resonators are perpendicular to the base plate.

11. An electromechanical filter according to claim 10 comprising a secondary coupling means attached to certain of said resonating elements to improve the frequency response.

12. An electromechanical filter according to claim 11 wherein said secondary coupling means comprises a rod attached to the surface of certain of said resonating elements.